US010810848B2

(12) United States Patent
Chang et al.

(10) Patent No.: US 10,810,848 B2
(45) Date of Patent: Oct. 20, 2020

(54) ELECTRONIC DEVICE EQUIPPED WITH ANTI-THEFT FUNCTION AND METHOD FOR PERFORMING ANTI-THEFT MANAGEMENT

(71) Applicant: ACER INCORPORATED, New Taipei (TW)

(72) Inventors: Chia-Lun Chang, New Taipei (TW); Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/421,504

(22) Filed: May 24, 2019

(65) Prior Publication Data

US 2020/0202692 A1 Jun. 25, 2020

(30) Foreign Application Priority Data

Dec. 25, 2018 (TW) .............................. 107146970 A

(51) Int. Cl.
*G08B 13/24* (2006.01)
*G06F 3/0488* (2013.01)

(52) U.S. Cl.
CPC ..... *G08B 13/2462* (2013.01); *G06F 3/04883* (2013.01)

(58) Field of Classification Search
None
See application file for complete search history.

(56) References Cited

U.S. PATENT DOCUMENTS

| 9,244,576 B1 | 1/2016 | Vadagave | |
|---|---|---|---|
| 2009/0307768 A1* | 12/2009 | Zhang | G06F 21/36 726/19 |
| 2016/0132737 A1 | 5/2016 | Bechtel | |
| 2018/0067596 A1* | 3/2018 | Wells | G06F 3/016 |

FOREIGN PATENT DOCUMENTS

| CN | 101410781 A | 4/2009 |
|---|---|---|
| CN | 106023279 A | 10/2016 |
| TW | 201516627 A | 5/2015 |

* cited by examiner

*Primary Examiner* — Thomas S McCormack
(74) *Attorney, Agent, or Firm* — Winston Hsu

(57) ABSTRACT

An electronic device equipped with an anti-theft function may include a touch-sensitive panel and a processing circuit. The touch-sensitive panel may perform sensing of a first electrode of an input device and multiple fingers of a user, to detect a first detection point corresponding to the first electrode and multiple other detection points respectively corresponding to the multiple fingers, wherein when the input device is put on the touch-sensitive panel, the first detection point corresponds to a first location of the first electrode on the touch-sensitive panel, and when the multiple fingers touch the touch-sensitive panel, the multiple other detection points correspond to multiple other locations of the multiple fingers on the touch-sensitive panel, respectively. When at least one predetermined condition is satisfied, the processing circuit enables the anti-theft function. When at least one release condition is satisfied, the processing circuit disables the anti-theft function.

18 Claims, 11 Drawing Sheets

ELECTRONIC DEVICE EQUIPPED WITH ANTI-THEFT FUNCTION AND METHOD FOR PERFORMING ANTI-THEFT MANAGEMENT

BACKGROUND OF THE INVENTION

1. Field of the Invention

The present invention is related to security management of electronic devices, and more particularly, to an electronic device equipped with an anti-theft function and a method for performing anti-theft management.

2. Description of the Prior Art

When a user operates a large computer device such as a laptop computer or tablet in a public place, they need to keep the computer device on their person in order to prevent theft, which is inconvenient. Some anti-theft methods have been proposed to try solving this problem, but are ineffective under certain conditions. For example, an additional device such as an anti-theft lock can be configured to lock the computer device, but it may be hard to find a suitable place for locking the computer device. In another example, another additional device such as an anti-loss device can be attached to the computer device, but the computer device might already have been stolen when the user receives a notification. Thus, there is a need for a novel method and associated architecture to improve security management of an electronic device.

SUMMARY OF THE INVENTION

An objective of the present invention is to provide an electronic device equipped with an anti-theft function and a method for performing anti-theft management, to solve the aforementioned problems.

At least one embodiment of the present invention provides an electronic device equipped with an anti-theft function, which may comprise a touch-sensitive panel and a processing circuit coupled to the touch-sensitive panel. The touch-sensitive panel may be configured to perform sensing of a first electrode of an input device and multiple fingers of a user, to detect a first detection point corresponding to the first electrode and multiple other detection points respectively corresponding to the multiple fingers, wherein when the input device is put on the touch-sensitive panel, the first detection point corresponds to a first location of the first electrode on the touch-sensitive panel, and when the multiple fingers touch the touch-sensitive panel, the multiple other detection points correspond to multiple other locations of the multiple fingers on the touch-sensitive panel, respectively. In addition, the processing circuit may be configured to control operations of the electronic device. When at least one predetermined condition is satisfied, the processing circuit enables the anti-theft function, wherein the aforementioned at least one predetermined condition is at least related to the first location. When at least one release condition is satisfied, the processing circuit disables the anti-theft function, wherein the aforementioned at least one release condition is related to the first location and the multiple other locations.

At least one embodiment of the present invention provides a method for performing anti-theft management, which is applicable to an electronic device. The method comprises: utilizing a touch-sensitive panel of the electronic device to perform sensing of a first electrode of an input device and multiple fingers of a user, to detect a first detection point corresponding to the first electrode and multiple other detection points respectively corresponding to the multiple fingers, wherein in response to the input device being put on the touch-sensitive panel, the first detection point corresponds to a first location of the first electrode on the touch-sensitive panel, and in response to the multiple fingers touching the touch-sensitive panel, the multiple other detection points correspond to multiple other locations of the multiple fingers on the touch-sensitive panel, respectively; in response to at least one predetermined condition being satisfied, enabling the anti-theft function, wherein said at least one predetermined condition is at least related to the first location; and in response to at least one release condition being satisfied, disabling the anti-theft function, wherein said at least one release condition is related to the first location and the multiple other locations.

At least one embodiment of the present invention provides an electronic device equipped with an anti-theft function, which may comprise a touch-sensitive panel and a processing circuit coupled to the touch-sensitive panel. The touch-sensitive panel may be configured to perform sensing of a first electrode of an input device and multiple fingers of a user, to detect a first detection point corresponding to the first electrode and multiple other detection points respectively corresponding to the multiple fingers, wherein when the input device is put on the touch-sensitive panel, the first detection point corresponds to a first location of the first electrode on the touch-sensitive panel, and when the multiple fingers touch the touch-sensitive panel, the multiple other detection points correspond to multiple other locations of the multiple fingers on the touch-sensitive panel, respectively. In addition, the processing circuit may be configured to control operations of the electronic device. When at least one predetermined condition is satisfied, the processing circuit enables the anti-theft function, wherein the aforementioned at least one predetermined condition is at least related to the first location. When at least one release condition is satisfied, the processing circuit disables the anti-theft function, wherein the aforementioned at least one release condition is related to a gesture applied to the touch-sensitive panel by at least one finger of the user.

The present invention can perform proper management regarding security of the electronic device, and more particularly, can implement the anti-theft function without increasing additional devices, to avoid the problems in the related art. In addition, implementation of the present invention will not greatly increase additional costs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. Lisa diagram illustrating an electronic system according to an embodiment of the present invention, where the electronic system comprises an input device and an electronic device equipped with an anti-theft function.

DETAILED DESCRIPTION

Figure 1:
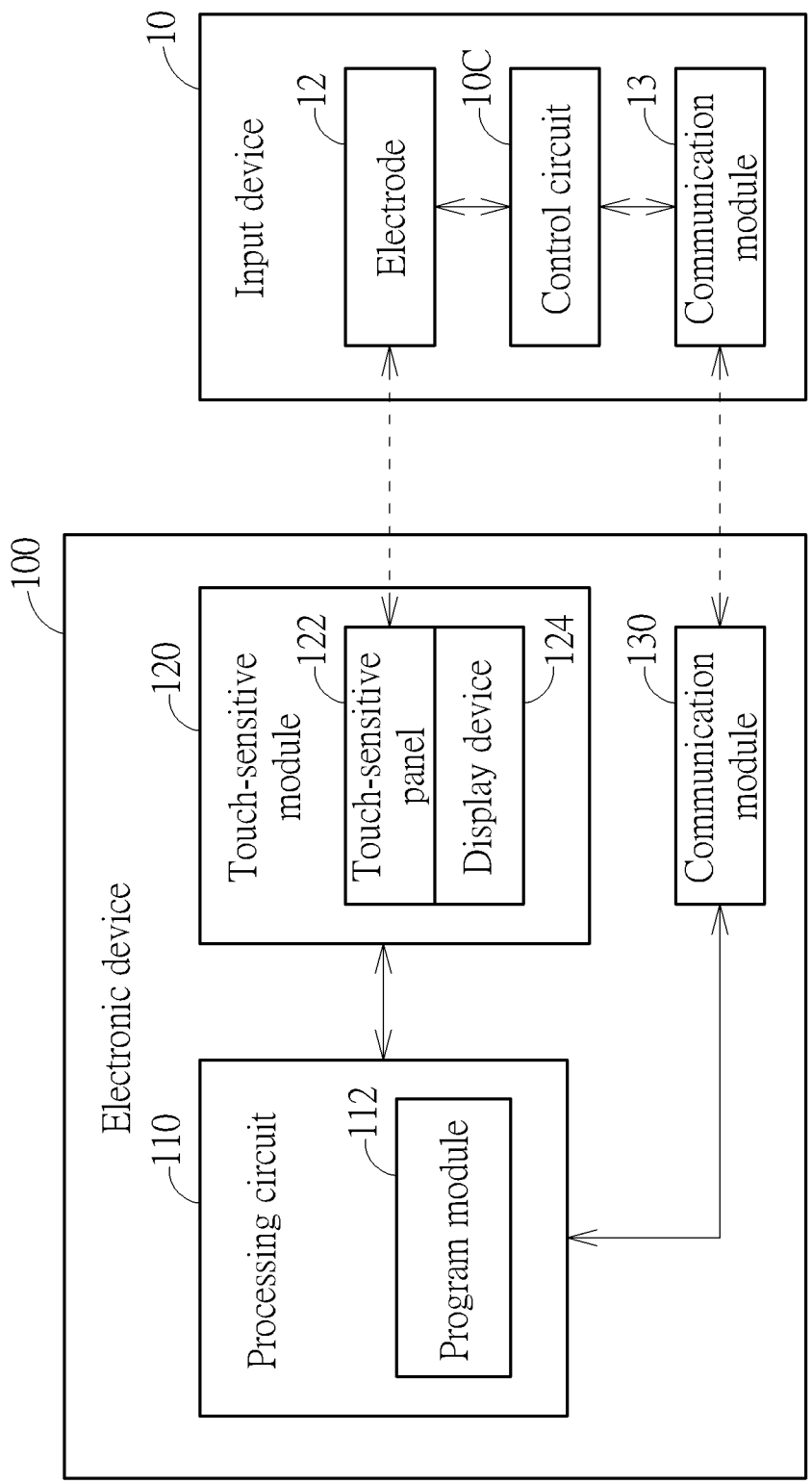

FIG. 1 is a diagram illustrating an electronic system according to an embodiment of the present invention, where the electronic system comprises an input device 10 and an electronic device 100 equipped with an anti-theft function. As shown in FIG. 1, the input device 10 may comprise a control circuit 10C, a communication module 13, and at least one electrode (e.g. one or more electrodes) which may be collectively referred to as the electrode 12. In addition, the electronic device 100 may comprise a processing circuit 110, a touch-sensitive module 120 and a communication module 130, and the touch-sensitive module 120 may comprise a touch-sensitive panel 122 and a display device 124 which are respectively coupled to the processing circuit 110.

In the aforementioned embodiment, the input device 10 may be implemented by an active stylus pen or other suitable input devices; the control circuit 10C may be implemented by a microprocessor, a memory and associated circuits; the electrode 12 may be implemented by a single electrode, dual electrodes or multiple electrodes; and the communication module 13 may be implemented by a wireless communications architecture conforming to BlueTooth or other communications protocols. In addition, the electronic device 100 may be implemented by a laptop computer or a tablet; the processing circuit 110 may be implemented by a processor, a memory, a bus, and associated circuits; the touch-sensitive panel 122 may be implemented by a touch control panel or other suitable touch control devices; the display device 124 may be implemented by a liquid crystal display (LCD) device or other suitable display devices; the touch-sensitive module 120 may be implemented by a touch control screen, or an architecture with separated touch control device and display device; and the communication module 130 may be implemented by a wireless communications architecture conforming to BlueTooth or other communications protocols.

According to this embodiment, the control circuit 10C and the processing circuit 110 may be configured to control operations of the input device 10 and the electronic device 100, and the electrode 12 and the touch-sensitive panel 122 may be configured to perform touch control. For example, the electrode 12 may comprise an electrode Tx1. The touch-sensitive panel 122 may be configured to sense the electrode Tx1 and multiple fingers of a user, to detect a detection point A corresponding to the electrode Tx1 and other detection points respectively corresponding to the multiple fingers. When the input device 10 is put on the touch-sensitive panel 122, the detection point A corresponds to a first location of the electrode Tx1 on the touch-sensitive panel 122. In addition, when the multiple fingers are close to (more particularly, touch) the touch-sensitive panel 122, the other detection points respectively correspond to multiple other locations of the multiple fingers on the touch-sensitive panel 122. Additionally, if needed, the communication module 13 and 130 may be respectively configured to perform wireless communications for the input device 10 and the electronic device 100 in order to allow the input device 10 and the electronic device 100 to exchange information with each other.

Figure 2:
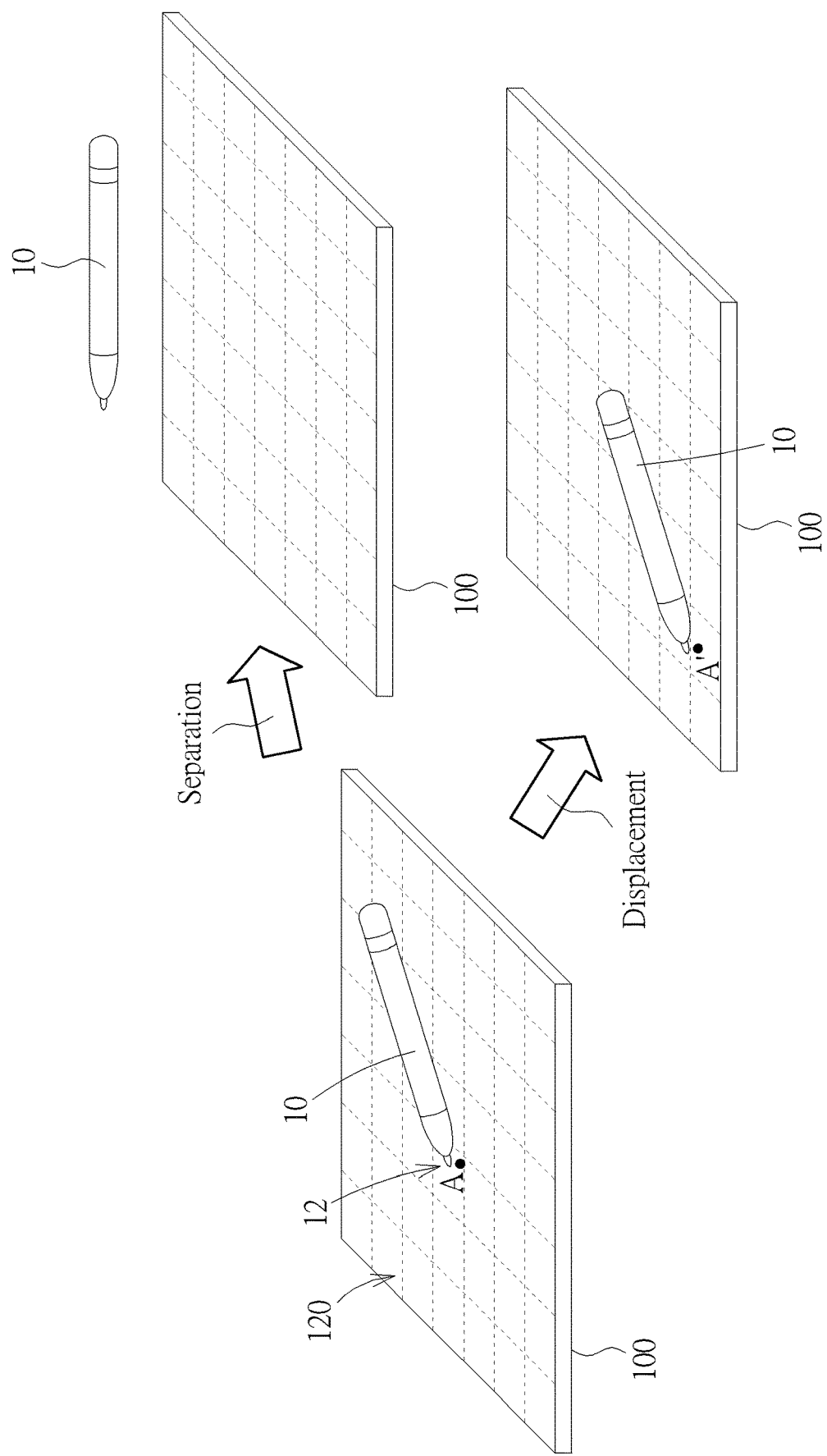
FIG. 2 is a control scheme of a method for performing anti-theft management according to an embodiment of the present invention.

FIG. 2 is a control scheme of a method for performing anti-theft management according to an embodiment of the present invention, where the method is applicable to the aforementioned electronic system, the electronic device 100, the processing circuit 110 and other components within the architecture shown in FIG. 1. For example, a program module 112 may correspond to the method, and the processing circuit 110 executing the program module 112 may control the operations of the electronic device 100. When at least one predetermined condition (e.g. one or more conditions) is satisfied, the processing circuit 110 may enable the anti-theft function, where the aforementioned at least one predetermined condition may be at least related to the first location. When at least one release condition is satisfied, the processing circuit 110 may disable the anti-theft function, where the aforementioned at least one release condition may be related to the first location and the multiple other locations.

Assuming that a thief does not know the aforementioned at least one release condition, when the input device is arbitrarily moved, related operations of the anti-theft function may be triggered in order to prevent the electronic device 100 from being stolen. As shown in the lower right corner of FIG. 2, a displacement of the input device 10 relative to the touch-sensitive module 120 (more particularly, the touch-sensitive panel 122) may cause a change in the first location, where the detection point A may be referred to as a detection point A' after this displacement. As shown in the upper right corner of FIG. 2, separation of the input device 10 and the touch-sensitive module 120 (more particularly, the touch-sensitive panel 122) may cause disappearance of the detection point A. According to this embodiment, after the anti-theft function is enabled, when the change of the first location or the disappearance of the detection point A is detected, the processing circuit 110 may trigger an alarm or a warning message. For example, the processing circuit 110 may control the electronic device 100 to directly output the alarm (more particularly, make a loud noise) as a deterrent for the thief, and/or allow someone (such as the user or other people) to stop the theft in time. In another example, the processing circuit 110 may control the electronic device 100 to inform another electronic device associated with the electronic device 100 through one or more communication modules to make the other electronic device output the alarm or show (e.g. display) the warning message, thereby enabling the user to stop the theft in time, where the user may carry the other electronic device to be notified of this situation through the alarm or the warning message.

In the aforementioned embodiment, the other electronic device may be implemented by a portable electronic device such as a multifunctional mobile phone or an electronic device with other architecture. The one or more communication modules of the electronic device 100 may be implemented by utilizing wireless communications architectures conforming to BlueTooth, Wi-Fi or other communications protocols for implementation. The alarm may be implemented by a specific ring, audio file, or multimedia. The warning message may be implemented by an email, a text message, or a pop-up window. The aforementioned at least one predetermined condition may be implemented by a default definition or a user definition, and the aforementioned at least one release condition may be implemented by a default definition or a user definition.

Figure 3:
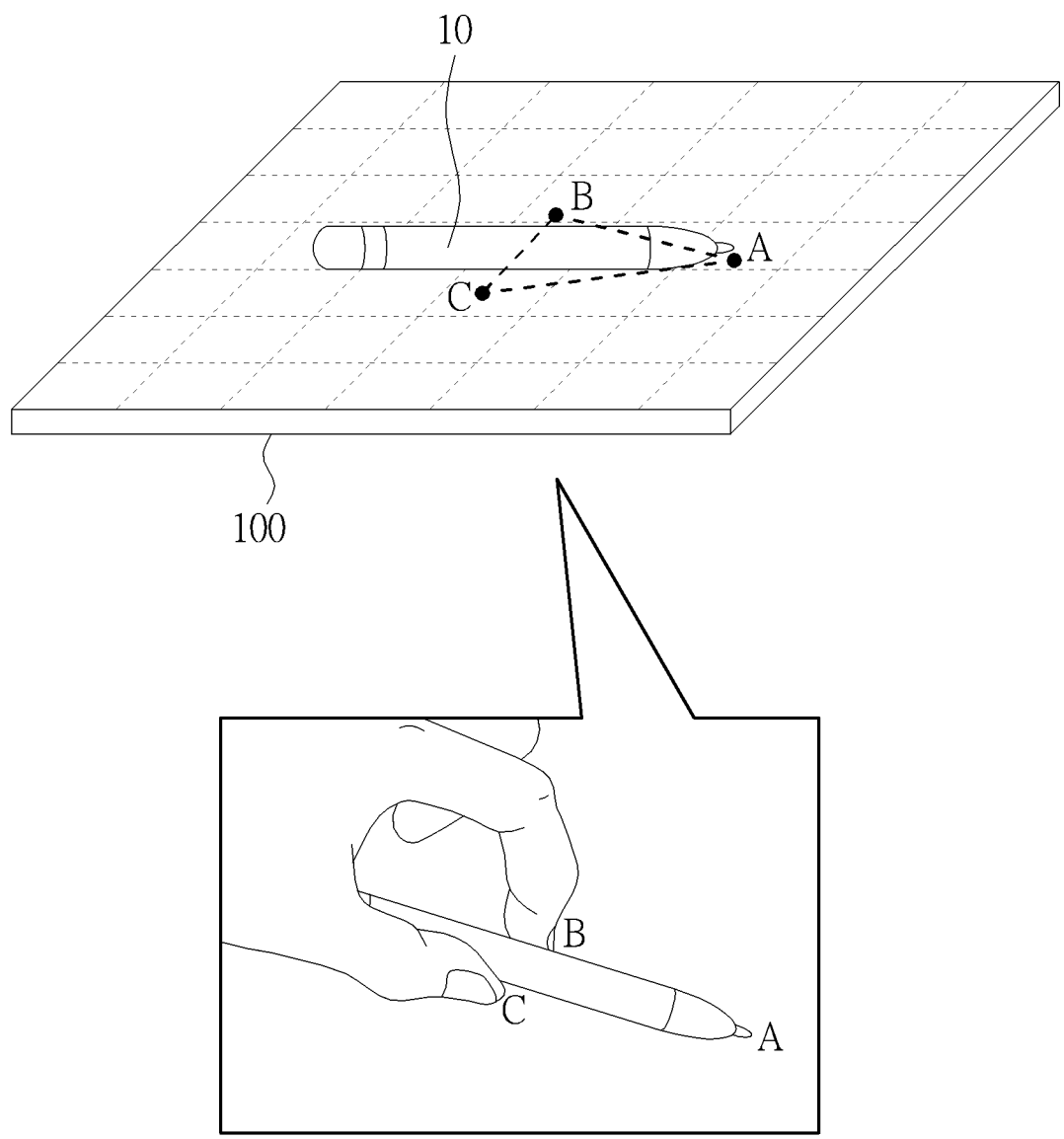
FIG. 3 illustrates three detection points detected by the electronic device and corresponding touch control operations in an embodiment of the present invention.

FIG. 3 illustrates three detection points A, B and C detected by the electronic device 100 and corresponding touch control operations in an embodiment of the present invention, where the detection points B and C may be examples of the multiple other detection points, and two fingers of the user may be examples of the multiple fingers. The aforementioned at least one predetermined condition may be related to the first location and the multiple other locations. When the first location (e.g. the location of the detection point A) and the multiple other locations (e.g. respective locations of the detection points B and C) are detected as remaining unchanged within a time interval and the time interval reaches a predetermined time (e.g. 2 seconds), the processing circuit 110 may enable the anti-theft function. In some embodiment, the predetermined time may be implemented as 2 seconds or any other length of time.

Figure 4:
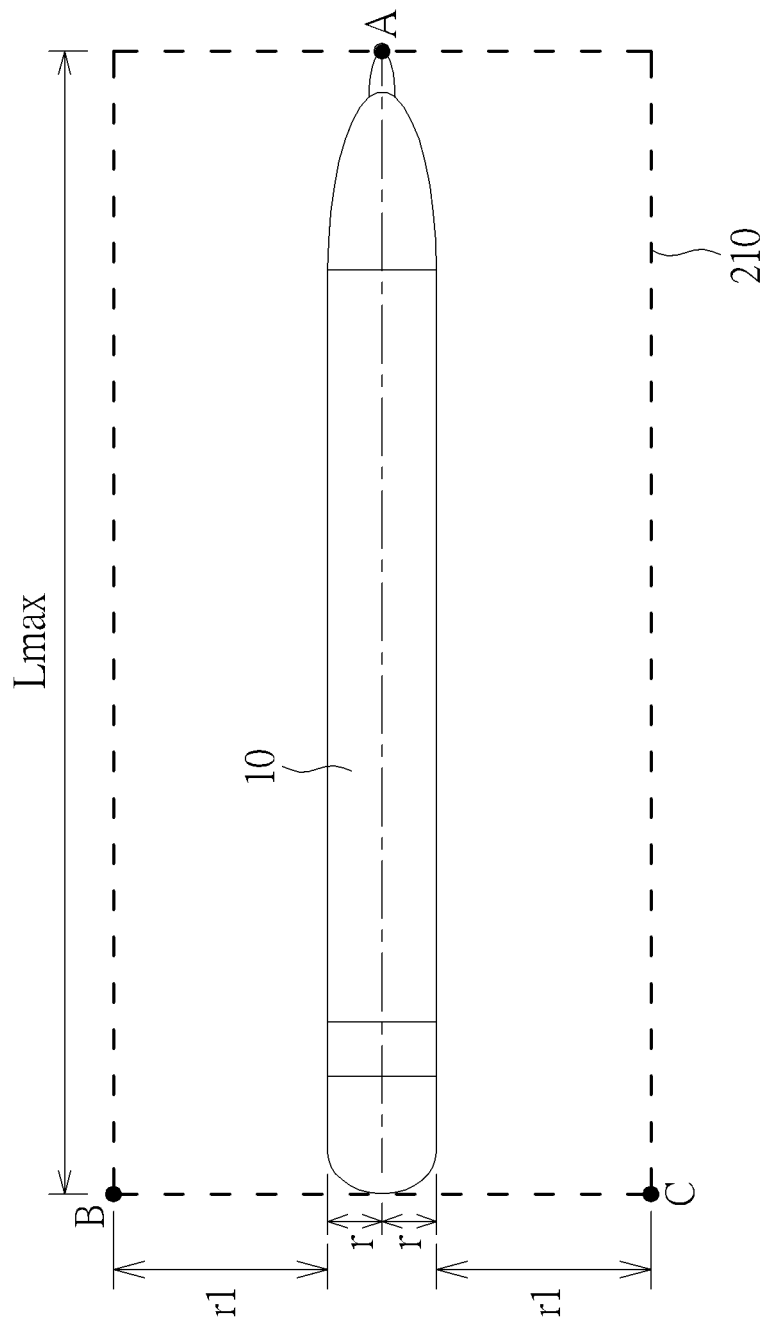
FIG. 4 illustrates a predetermined region utilized by the electronic device in an embodiment of the present invention, where the predetermined region may be configured to determine whether to enable the anti-theft function.

FIG. 4 illustrates a predetermined region 210 utilized by the electronic device 100 in an embodiment of the present invention, where the predetermined region 210 may be configured to determine whether to enable the anti-theft function. Before the anti-theft function is enabled, when the multiple other detection points (e.g. the detection points B and C) are detected, the processing circuit 110 may determine the predetermined region 210 on the touch-sensitive panel 122 at least according to multiple predetermined parameters Lmax, r and r1, and the first location (e.g. the location of the detection point A). As shown in FIG. 4, the predetermined region 210 may be defined by the predetermined parameters Lmax, r and r1, and may be a rectangle having a size of (Lmax*(r+r1)). The predetermined parameters Lmax and r may respectively represent a length and a radius of the input device 10 (e.g. the active stylus pen), and the predetermined parameter r1 may represent a predetermined value which may correspond to or approximate to a typical finger thickness. In this embodiment, r1 is greater than r. For example, r1=20 millimeter (mm), r=3 mm, and Lmax=100 mm. In some embodiments, the predetermined parameter Lmax, r and r1 may vary.

Assuming that the user puts the input device 10 on the touch-sensitive panel 122 using the two fingers, no matter how relative locations of the two fingers relative to the input device 10 change, the predetermined region 210 may exactly surround (or cover) a projection of the input device 10 on the touch-sensitive panel 122 and all possible projections of the two fingers on the touch-sensitive panel 122. For example, the detection points B and C might be respectively located at a top-right corner and a bottom-right corner of the predetermined region 210, or might be right shifted by a certain distance but do not reach the top-right corner and the bottom-right corner. The detection points A, B and C may form a triangle, where a symmetric axis of the triangle passes through the detection point A and may serve as a symmetric axis of the predetermined region 210. Therefore, the processing circuit 110 may determine an orientation (such as a direction or a location) of the predetermined region 210 according to the triangle (more particularly, the symmetric axis thereof).

According to some embodiments, before the anti-theft function is enabled, when the multiple other detection points (e.g. the detection points B and C) are detected, the processing circuit 110 may first determine a location and a range of the predetermined region 210. In a situation where the first location (e.g. the location of the detection point A) and the multiple other locations (e.g. the respective locations of the detection points B and C) are located in the predetermined region 210, when the first location and the multiple other locations are detected as remaining unchanged within the time interval and the time interval reaches the predetermined time (e.g. 2 seconds), the processing circuit 110 may enable the anti-theft function.

Figure 5:
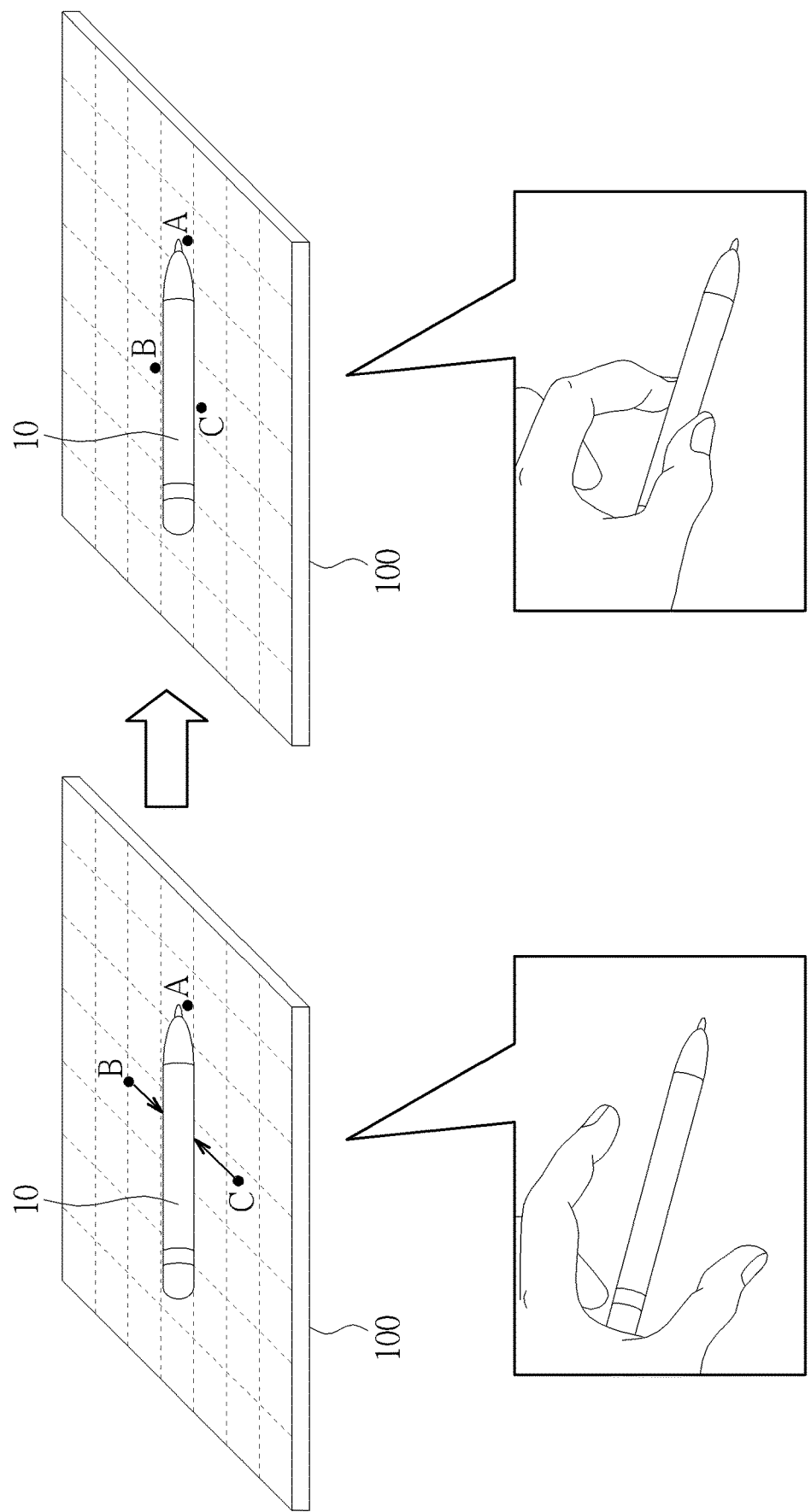
FIG. 5 illustrates three detection points detected by the electronic device and corresponding touch control operations in another embodiment of the present invention.

FIG. 5 illustrates three detection points A, B and C detected by the electronic device 100 and corresponding touch control operations in another embodiment of the present invention, where the detection points B and C may be examples of the multiple other detection points, and the two fingers of the user may be examples of the multiple fingers. After the anti-theft function is enabled, the processing circuit 110 may determine whether to disable the anti-theft function according to whether movements of the multiple detection points (e.g. the detection points B and C) conform to the aforementioned at least one release condition.

Figure 6:
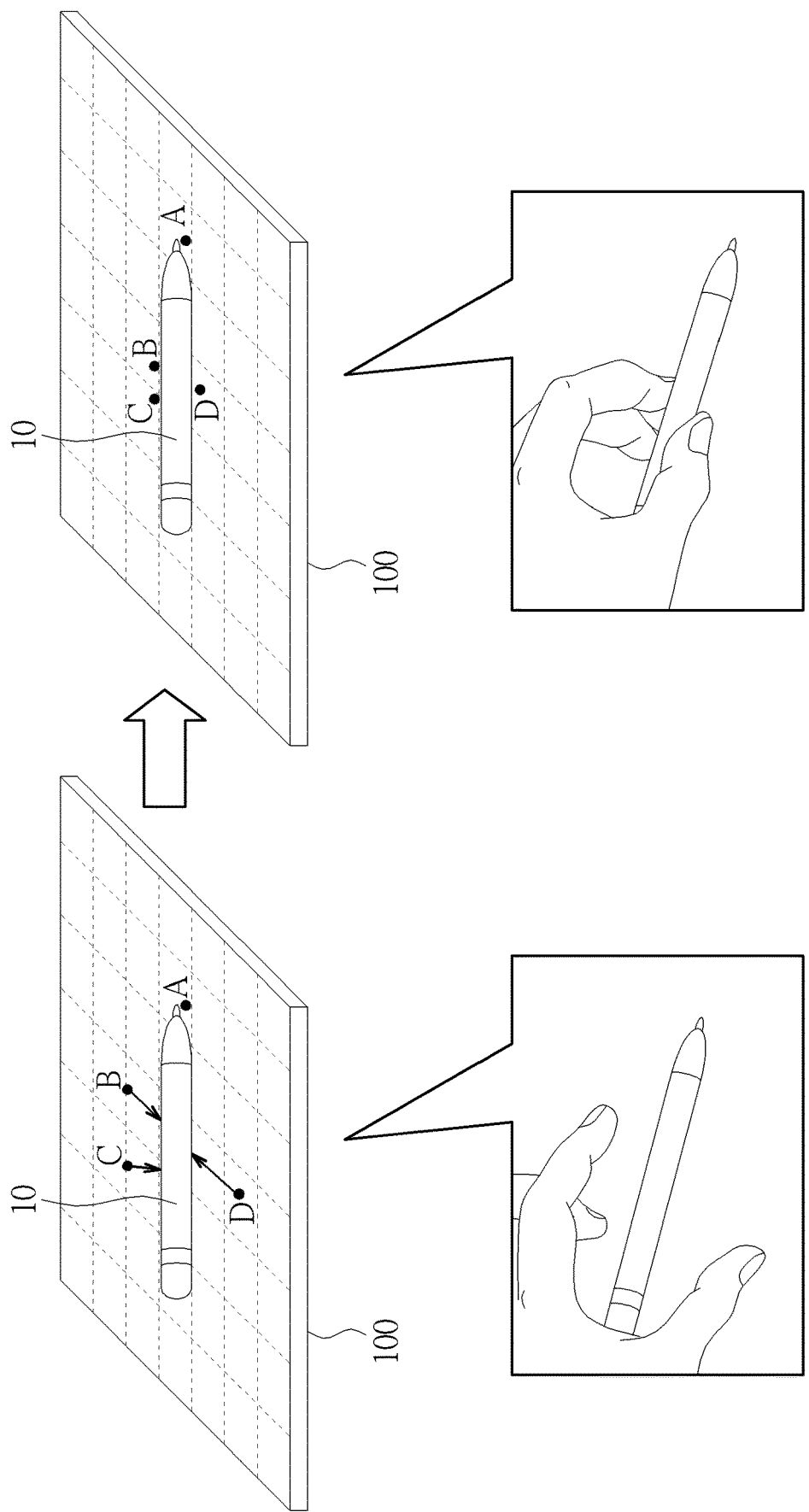
FIG. 6 illustrates four detection points detected by the electronic device and corresponding touch control operations in another embodiment of the present invention.

FIG. 6 illustrates four detection points A, B, C and D detected by the electronic device 100 and corresponding touch control operations in another embodiment of the present invention, where the detection points B, C and D may be examples of the multiple other detection points, and three fingers of the user may be examples of the multiple fingers. After the anti-theft function is enabled, the processing circuit 110 may determine whether to disable the anti-theft function according to whether movements of the multiple detection points (e.g. the detection points B, C and D) conform to the aforementioned at least one release condition.

Figure 7:
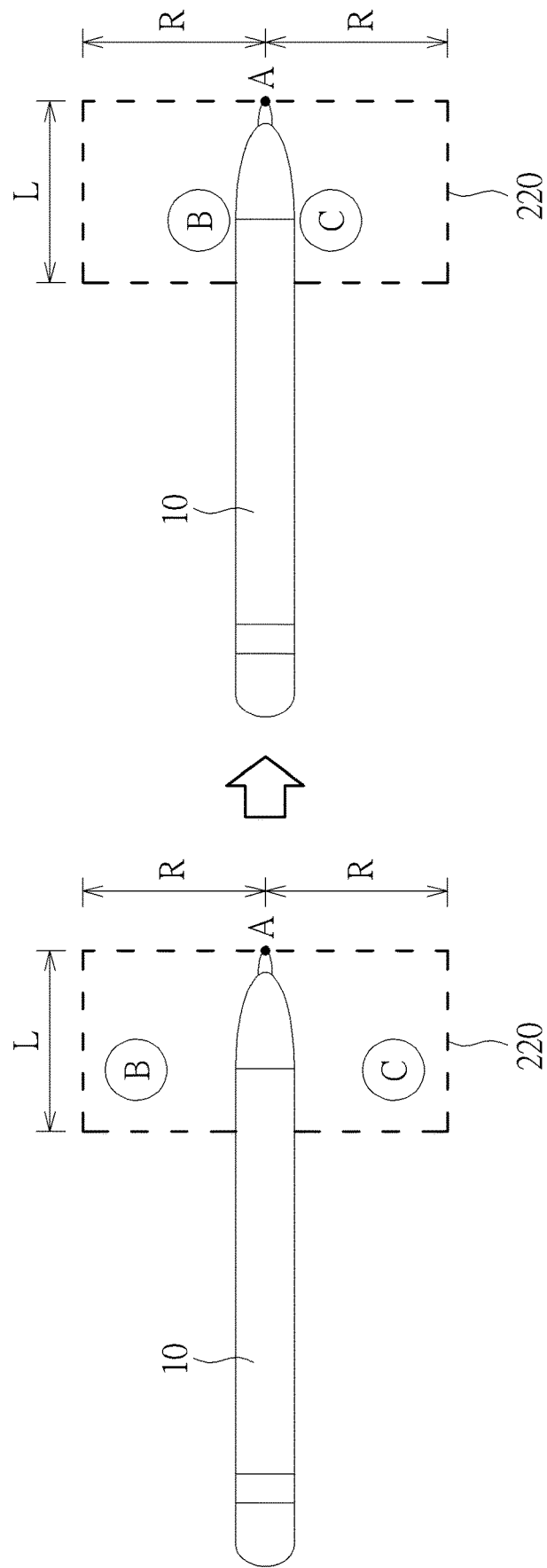
FIG. 7 illustrates a predetermined region utilized by the electronic device and some touch control operations in an embodiment of the present invention, where the predetermined region may be configured to determine whether to disable the anti-theft function.

FIG. 7 illustrates a predetermined region 220 utilized by the electronic device 100 and some touch control operations in an embodiment of the present invention, where the predetermined region 220 may be configured to determine whether to disable the anti-theft function. After the anti-theft function is enabled, when the multiple other detection points (e.g. the detection point B and C) are detected, the processing circuit 110 may determine the predetermined region 220 on the touch-sensitive panel 122 at least according to multiple predetermined parameters L and R and the first location (e.g. the location of the detection point A). As shown in FIG. 7, the predetermined region 220 may be defined by the predetermined parameters L and R, and may be a rectangle having a size of (L*(2R)). The predetermined parameters L and R may be determined by referring to a typical hand size. In this embodiment, L is less than Lmax and R is greater than (r+r1). For example, L=30 mm and R=30 mm. In some embodiments, the predetermined parameters L and R may vary.

Assume that the user picks up the input device 10 from the touch-sensitive panel 122 using the two fingers. The detection points A, B and C may form a triangle, where a symmetric axis of the triangle passes through the detection point A and may serve as a symmetric axis of the predetermined region 220. Therefore, the processing circuit 110 may determine an orientation (such as a direction or a location) of the predetermined region 220 according to the triangle (more particularly, the symmetric axis thereof). According to this embodiment, the processing circuit 110 may determine whether to disable the anti-theft function according to whether the multiple other detection points (e.g. the detection points B and C) move into the predetermined region 220 from outside of the predetermined region 220. If the multiple other detection points move into the predetermined region 220 from outside of the predetermined region 220, the processing circuit 110 may disable the anti-theft function; otherwise, the processing circuit 110 may trigger the alarm or the warning message.

For better comprehension, the detection points B and C are respectively labeled at the centers of circles to indicate that the detection points B and C are respectively located at the centers of fingertips. The user may verify whether the anti-theft function works through the touch control operations shown in FIG. 7. For example, the touch control operations shown in FIG. 7 do not conform to the aforementioned at least one release condition (e.g. the detection points B and C do not move into the predetermined region 220 from outside of the predetermined region 220), and the processing circuit 110 may therefore trigger the alarm or the warning message. Similarly, when touch control operations of a theft do not conform to the aforementioned at least one release condition (e.g. the detection points B and C do not move into the predetermined region 220 from outside of the predetermined region 220), the processing circuit 110 triggers the alarm or the warning message.

Figure 8:
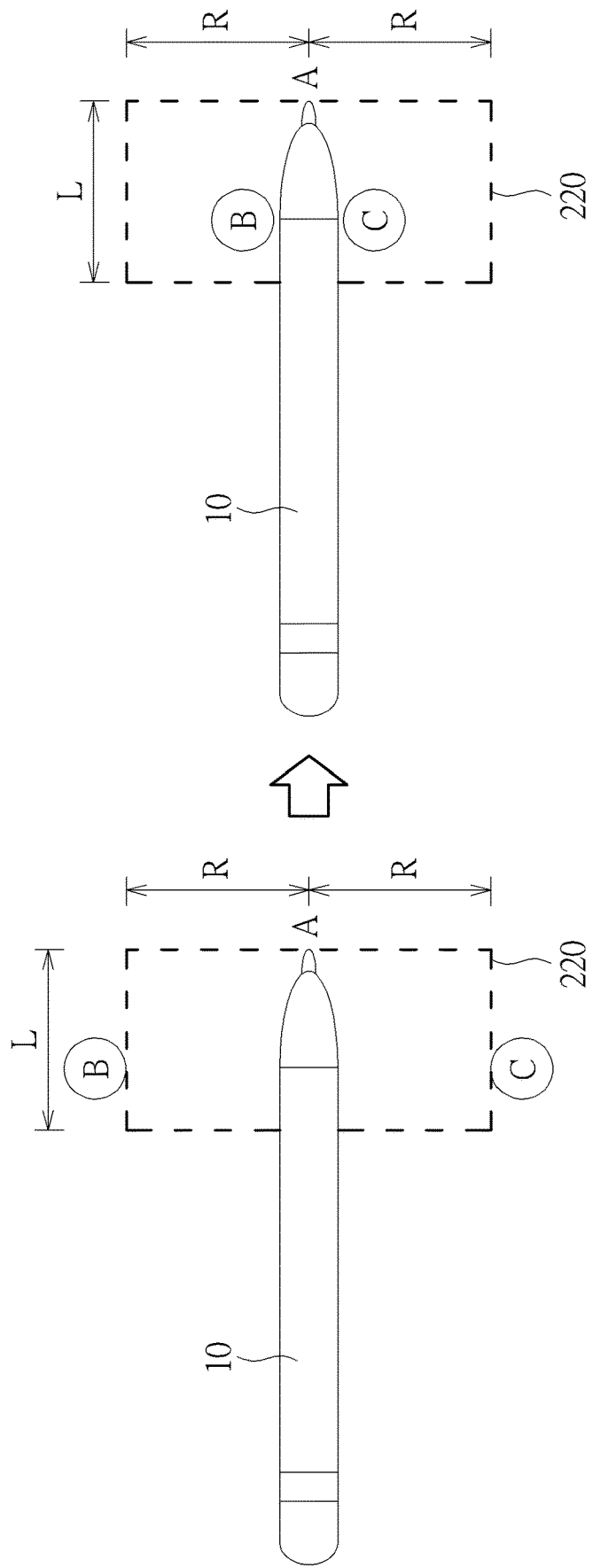
FIG. 8 illustrates some touch control operations related to the predetermined region shown in FIG. 7 according to another embodiment of the present invention.

FIG. 8 illustrates some touch control operations related to the predetermined region 220 shown in FIG. 7 according to another embodiment of the present invention. The user may disable the anti-theft function through the touch control operations shown in FIG. 8, in order to continue using the electronic device 100 without triggering a false alarm. For example, the touch control operations shown in FIG. 8 conform to the aforementioned at least one release condition (e.g. the detection points B and C move into the predetermined region 220 from outside of the predetermined region 220), and the processing circuit 110 may therefore disable the anti-theft function to allow the user to continue using the electronic device 100.

According to some embodiments, the detection points B, C and D may be examples of the multiple other detection points, and the three fingers of the user may be examples of the multiple fingers. After the anti-theft function is enabled, when the multiple other detection points (e.g. the detection points B, C and D) are detected, the processing circuit 110 may determine the predetermined region 220 on the touch-sensitive panel 122 at least according to multiple predetermined parameters L and R and the first location (e.g. the location of the detection point A). More specifically, the processing circuit 110 may calculate a location of a geometric center such as centroid of a polygon formed by the multiple other detection points (e.g. the detection points B, C and D), such as an average location of respective locations of the multiple other detection points, where an axis passing through the centroid and the detection point A may serve as a symmetric axis of the predetermined region 220.

Assume that the user picks up the input device 10 from the touch-sensitive panel 122 using the three fingers. For example, the detection points B, C and D may form a triangle, and the processing circuit 110 may calculate a location of a centroid of the triangle, such as an average location of respective locations of the detection points B, C and D. Therefore, the processing circuit 110 may determine an orientation of the predetermined region 220 according to an axis passing through the centroid and the detection point A. For brevity, similar descriptions for these embodiments are not repeated in detail here.

Figure 9:
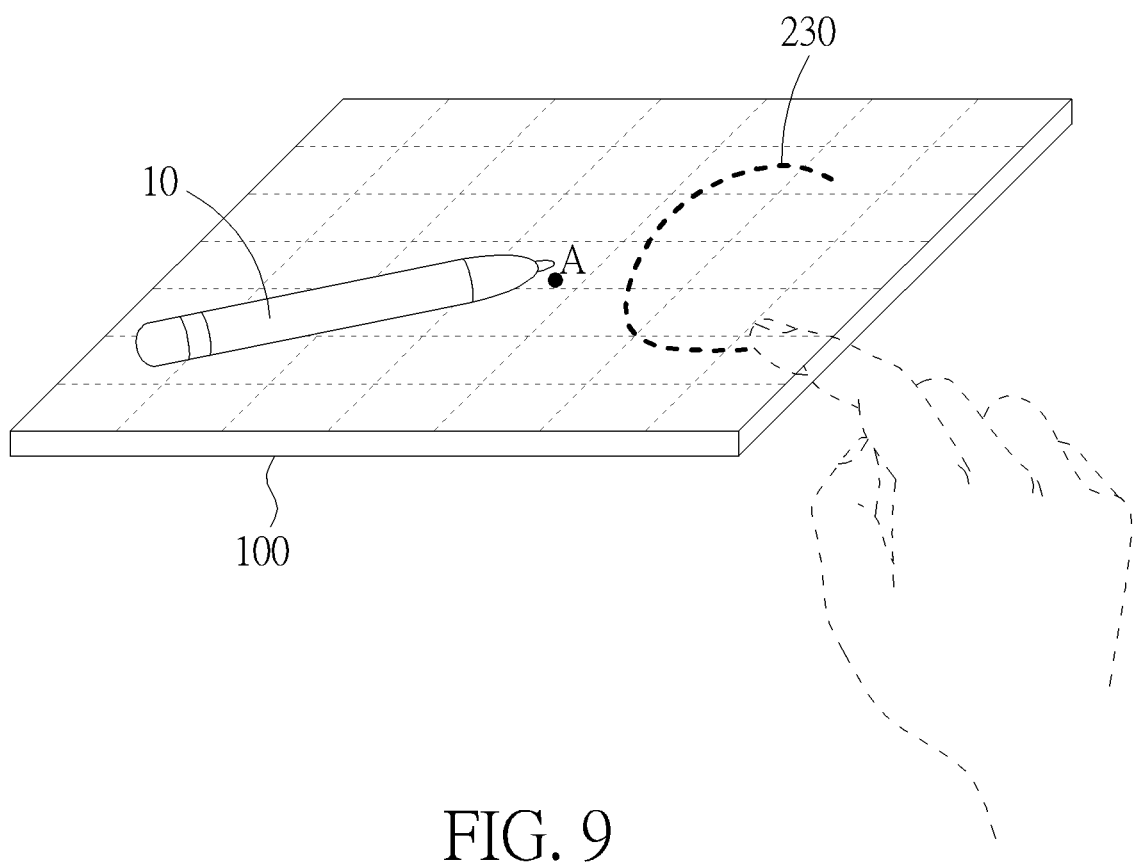
FIG. 9 illustrates a predetermined gesture utilized by the electronic device and corresponding touch control operations in an embodiment of the present invention, where the predetermined gesture may be configured to determine whether to disable the anti-theft function.

FIG. 9 illustrates a predetermined gesture 230 utilized by the electronic device 100 and corresponding touch control operations in an embodiment of the present invention, where the predetermined gesture 230 may be configured to determine whether to disable the anti-theft function. In comparison with the above embodiments, the aforementioned at least one release condition in this embodiment may be related to a gesture applied to the touch-sensitive panel 122 by the user using at least one finger of the user. For example, the aforementioned at least one finger may represent one of the multiple fingers or one or more other fingers of the user. For better comprehension, the predetermined gesture 230 may have a shape shown in FIG. 9 (e.g. "C" shaped). In some embodiments, the predetermined gesture 230 may have other shapes.

In addition, after the anti-theft function is enabled, when the gesture is detected, the processing circuit 110 may determine whether to disable the anti-theft function according to whether the gesture conforms to the predetermined gesture 230. If the gesture conforms to the predetermined gesture 230, the processing circuit 110 may disable the anti-theft function; otherwise, the processing circuit 110 may trigger the alarm or the warning message. For brevity, similar descriptions for this embodiment are not repeated in detail here.

In the aforementioned embodiment, the predetermined gesture 230 may be implemented by a default definition or a user definition.

Figure 10:
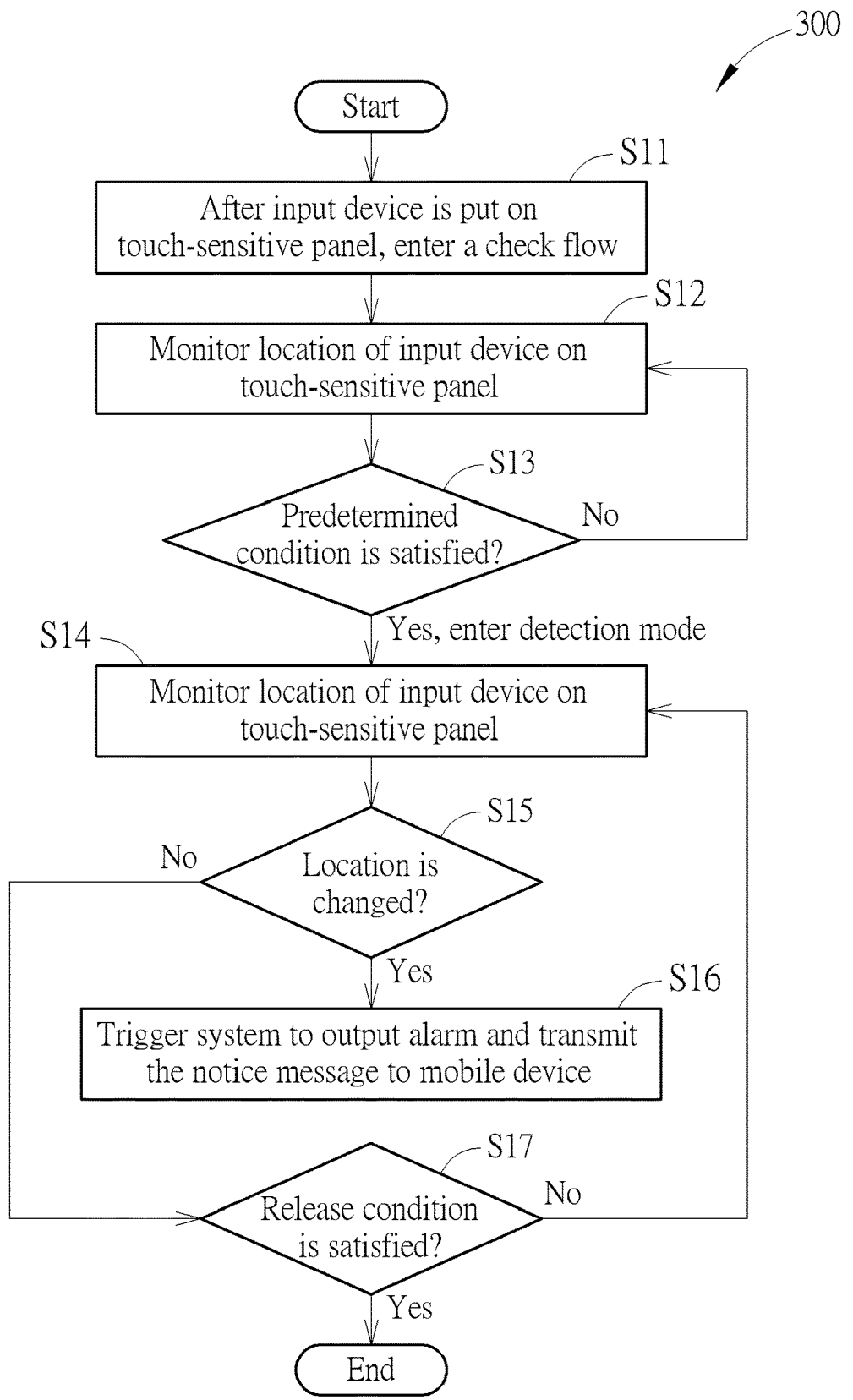
FIG. 10 illustrates a working flow of the method in an embodiment of the present invention.

FIG. 10 illustrates a working flow 300 of the method in an embodiment of the present invention. For better comprehension, the warning message and the other electronic device in the working flow 300 may be described as a notice message and a mobile device, respectively.

In Step S11, after the input device 10 is put on the touch-sensitive panel 122, the electronic device 100 (e.g. the processing circuit 110) may enter a check flow (which may comprise operations from Step S12 to Step S17) to perform the aforementioned anti-theft management.

In Step S12, the processing circuit 110 may monitor a location of the input device 10 on the touch-sensitive panel 122.

In Step S13, the processing circuit 110 may check whether the aforementioned at least one predetermined condition is satisfied. If yes, Step S14 is entered; if not, Step S12 is entered.

In Step S14, the processing circuit 110 may monitor the location of the input device 10 on the touch-sensitive panel 122.

In Step S15, the processing circuit may check whether the location (e.g. the location of the detection point A) is changed. If yes, Step S16 is entered; if not, Step S17 is entered.

In Step S16, the processing circuit 110 may trigger a system (operating thereon) to output the alarm and transmit the notice message to the mobile device.

In Step S17, the processing circuit 110 may check whether the aforementioned at least one release condition is satisfied. If yes, the working flow 300 is ended; if not, the Step S14 is entered.

In the aforementioned embodiment, the system may be implemented by an operating system (OS) or other program architecture; the notice message may be implemented by an email, a text message, a pop-up window, etc.; and the mobile device may be implemented by a multifunctional mobile phone or electronic device with other architectures.

In addition, enabling the anti-theft function may represent entering a detection mode, and disabling the anti-theft function may represent leaving the detection mode. In the detection mode, when the first location (e.g. the location of the detection point A) is detected to be changed or the detection point A is detected to have disappeared, the processing circuit 110 may trigger the alarm or the warning message. For brevity, similar descriptions for this embodiment are not repeated in detail here.

According to some embodiments, one or more steps may be added, modified, or removed in the working flow 300.

Figure 11:
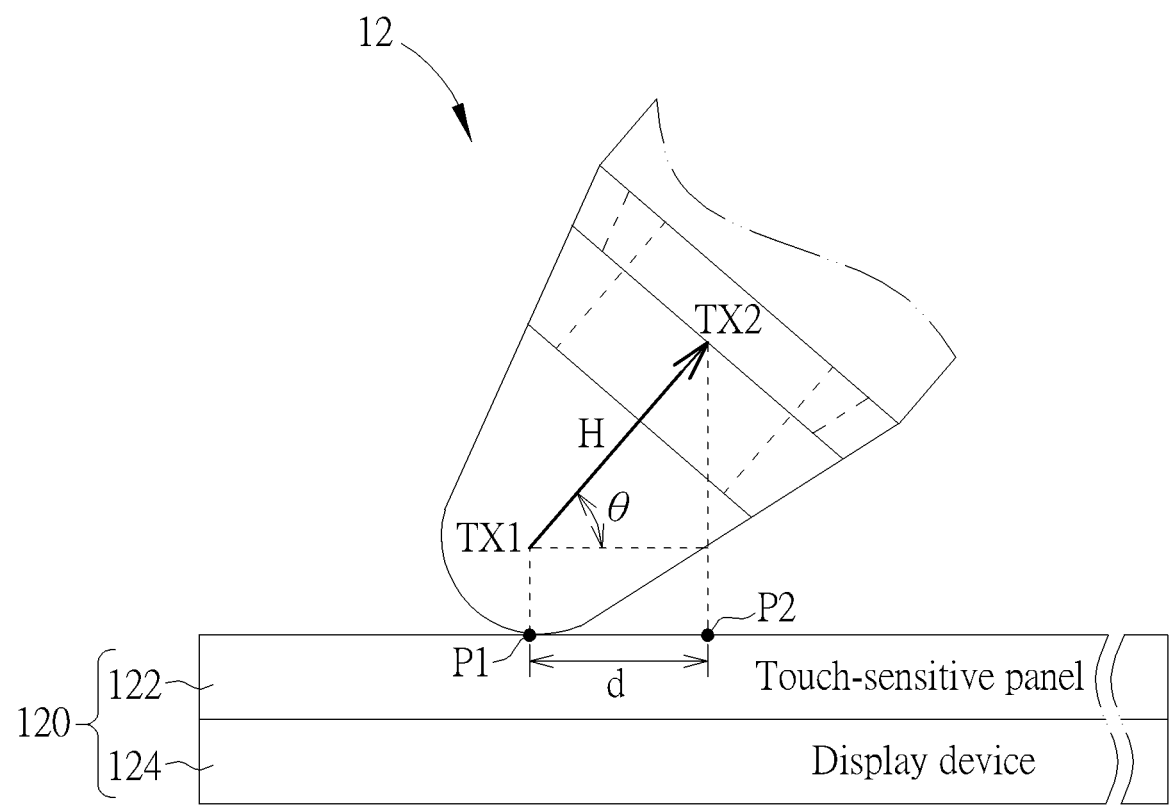
FIG. 11 illustrates two detection points detected by the electronic device in an embodiment of the present invention.

FIG. 11 illustrates two detection points P1 and P2 detected by the electronic device 100 in an embodiment of the present invention. In addition to the aforementioned electrode Tx1, the electrode 12 may further comprise an electrode Tx2, where the electrodes Tx1 and Tx2 may be isolated from each other by insulation material(s). For example, the electrode Tx2 may have a ring structure, and the electrodes Tx1 and Tx2 may have a same symmetric axis, which may be a symmetric axis of the electronic device 100. For better comprehension, a predetermined distance H may represent a distance between respective centers of the electrodes Tx1 and Tx2, and a distance d between the detection points P1 and P2 may be regarded as a projection amount of the predetermined distance H on the touch-sensitive panel 122. The processing circuit 110 may detect the distance d, and may perform determination related to an angle θ according to the distance d and the predetermined distance H.

According to this embodiment, the detection point P1 may represent the detection point A. The touch-sensitive panel 122 may be configured to sense the electrode Tx1 in order to detect the detection point P1 (such as the detection point A) corresponding to the electrode Tx1. In addition, the touch-sensitive panel 122 may be configured to sense the electrode Tx2 in order to detect the detection point P2 corresponding to the electrode Tx2. When the input device 10 is put on the touch-sensitive panel 122, the detection point P1 corresponds to the first location of the electrode Tx1 on the touch-sensitive panel 122, and the detection point P2 corresponds to a second location of the electrode Tx2 on the touch-sensitive panel 122. Additionally, the processing circuit 110 may determine whether the angle θ of the input device 10 relative to the touch-sensitive panel 122 is equal to a predetermined angle (e.g. 0 degrees) according to the first location and the second location (e.g. respective locations of the detection points P1 and P2). When it is detected that the angle θ is equal to the predetermined angle, the first location remains unchanged within a time interval, and the time interval reaches the predetermined time (e.g. 2 seconds), the processing circuit 110 may enable the anti-theft function.

Assume the predetermined angle is equal to 0 degrees. The processing circuit 110 may determine whether the angle θ is equal to the predetermined angle such as 0 degrees according to whether the distance d is equal to the predetermined distance H. If d=H, θ=0 (which means the input device 10 is put on the touch-sensitive panel 122); otherwise, θ>0 (which means the input device 10 is slanted rather than put on the touch-sensitive panel 122). Thus, when the distance d is equal to the predetermined distance H, the first location remains unchanged within the time interval, and the time interval reaches the predetermined time (e.g. 2 seconds), the processing circuit 110 may enable the anti-theft function. For brevity, similar descriptions for this embodiment are not repeated in detail here.

In some embodiments, the processing circuit 110 may calculate the angle θ according to the distance d and the predetermined distance H; for example, through the relationship of d=(H*cos(θ)) or a related mapping table. According to some embodiments, after the anti-theft function is enabled, when the multiple other detection points are detected, the processing circuit 110 may obtain initial values of the multiple other locations, and determine the predetermined region 220 on the touch-sensitive panel 122 according to the first location and the initial values. When the multiple other locations move into the predetermined region 220 from outside the predetermined region 220, the processing circuit 110 may disable the anti-theft function. For brevity, similar descriptions for these embodiments are not repeated in detail here.

According to some embodiments, the processing circuit 110 may provide a user interface in order to guide the user to define the aforementioned at least one predetermined condition and/or the aforementioned at least one release condition in advance; for example, guide the user to perform some touch control operations and detect these touch control operations in order to generate related parameters for reference by the aforementioned at least one predetermined condition and/or the aforementioned at least one release condition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device equipped with an anti-theft function, comprising:
   a touch-sensitive panel, configured to perform sensing of a first electrode of an input device and multiple fingers of a user, to detect a first detection point corresponding to the first electrode and multiple other detection points respectively corresponding to the multiple fingers, wherein when the input device is put on the touch-sensitive panel, the first detection point corresponds to a first location of the first electrode on the touch-sensitive panel, and when the multiple fingers touch the touch-sensitive panel, the multiple other detection points correspond to multiple other locations of the multiple fingers on the touch-sensitive panel, respectively; and
   a processing circuit, coupled to the touch-sensitive panel, configured to control operations of the electronic device, wherein:
     when at least one predetermined condition is satisfied, the processing circuit enables the anti-theft function, wherein said at least one predetermined condition is at least related to the first location; and
     when at least one release condition is satisfied, the processing circuit disables the anti-theft function, wherein said at least one release condition is related to the first location and the multiple other locations;
     wherein after the anti-theft function is enabled, when a change of the first location or a disappearance of the first detection point is detected, the processing circuit triggers an alarm or a warning message.

2. The electronic device of claim 1, wherein said at least one predetermined condition is related to the first location and the multiple other locations; and when the first location and the multiple other locations are detected as remaining unchanged within a time interval and the time interval reaches a predetermined time, the processing circuit enables the anti-theft function.

3. The electronic device of claim 1, wherein the touch-sensitive panel is further configured to perform sensing of a second electrode of the input device to detect a second detection point of the second electrode, wherein when the input device is put on the touch-sensitive panel, the second detection point corresponds to a second location of the second electrode on the touch-sensitive panel; the processing circuit determines whether an angle of the input device relative to the touch-sensitive panel is equal to a predetermined angle at least according to the first location and the second location; and when the angle is detected to be equal to the predetermined angle, the first location remains unchanged within a time interval, and the time interval reaches a predetermined time, the processing circuit enables the anti-theft function.

4. The electronic device of claim 1, wherein after the anti-theft function is enabled, when the multiple other detection points are detected, the processing circuit determines a predetermined region on the touch-sensitive panel at least according to multiple predetermined parameters and the first location; the processing circuit determines whether to disable the anti-theft function according to whether the multiple other detection points move into the predetermined region from outside of the predetermined region; and if the multiple other detection points moves into the predetermined region from outside of the predetermined region, the processing circuit disables the anti-theft function, otherwise, the processing circuit triggers an alarm or a warning message.

5. The electronic device of claim 1, wherein the processing circuit controls the electronic device to output the alarm.

6. The electronic device of claim 1, wherein the processing circuit controls the electronic device to inform another electronic device associated with the electronic device to make the other electronic device output the alarm or show the warning message.

7. The electronic device of claim 1, wherein the multiple fingers comprise two fingers of the user, the multiple other detection points comprise two other detection points respectively corresponding to the two fingers, and the two other detection points respectively correspond to two other locations of the two fingers on the touch-sensitive panel, wherein the multiple other locations comprise the two other locations.

8. The electronic device of claim 1, wherein the multiple fingers comprise three fingers of the user, the multiple other detection points comprise three other detection points respectively corresponding to the three fingers, and the three other detection points respectively correspond to three other locations of the three fingers on the touch-sensitive panel, wherein the multiple other locations comprise the three other locations.

9. The electronic device of claim 1, wherein after the anti-theft function is enabled, the processing circuit determines whether to disable the anti-theft function according to whether movements of the multiple detection points conform to said at least one release condition.

10. The electronic device of claim 9, wherein after the anti-theft function is enabled, when the multiple other detection points are detected, the processing circuit determines a predetermine region on the touch-sensitive panel at least according to multiple predetermined parameters and the first location, wherein said at least one release condition is related to movements of the multiple other detection points relative to the predetermined region.

11. A method for performing anti-theft management, the method being applicable to an electronic device, the method comprising:
   utilizing a touch-sensitive panel of the electronic device to perform sensing of a first electrode of an input device and multiple fingers of a user, to detect a first detection point corresponding to the first electrode and multiple other detection points respectively corresponding to the multiple fingers, wherein in response to the input device being put on the touch-sensitive panel, the first detection point corresponds to a first location of the first electrode on the touch-sensitive panel, and in response to the multiple fingers touching the touch-sensitive panel, the multiple other detection points correspond to multiple other locations of the multiple fingers on the touch-sensitive panel, respectively;
   in response to at least one predetermined condition being satisfied, enabling the anti-theft function, wherein said at least one predetermined condition is at least related to the first location; and
   in response to at least one release condition being satisfied, disabling the anti-theft function, wherein said at least one release condition is related to the first location and the multiple other locations;
   wherein the anti-theft function comprises triggering an alarm or a warning message in response to a change of the first location or a disappearance of the first detection point being detected.

12. The method of claim 11, wherein said at least one predetermined condition is related to the first location and the multiple other locations; and the method further comprises:
   in response to the first location and the multiple other locations being detected as remaining unchanged within a time interval and the time interval reaching a predetermined time, enabling the anti-theft function.

13. The method of claim 11, further comprising:
   utilizing the touch-sensitive panel to perform sensing of a second electrode of the input device to detect a second detection point of the second electrode, wherein in response to the input device being put on the touch-sensitive panel, the second detection point corresponds to a second location of the second electrode on the touch-sensitive panel;
   determining whether an angle of the input device relative to the touch-sensitive panel is equal to a predetermined angle at least according to the first location and the second location; and
   in response to the angle being detected to be equal to the predetermined angle, the first location remaining unchanged within a time interval, and the time interval reaching a predetermined time, enabling the anti-theft function.

14. An electronic device equipped with an anti-theft function, comprising:
   a touch-sensitive panel, configured to perform sensing of a first electrode of an input device and multiple fingers of a user, to detect a first detection point corresponding to the first electrode and multiple other detection points respectively corresponding to the multiple fingers, wherein when the input device is put on the touch-sensitive panel, the first detection point corresponds to a first location of the first electrode on the touch-sensitive panel, and when the multiple fingers touch the touch-sensitive panel, the multiple other detection points correspond to multiple other locations of the multiple fingers on the touch-sensitive panel, respectively; and a processing circuit, coupled to the touch-sensitive panel, configured to control operations of the electronic device, wherein:

when at least one predetermined condition is satisfied, the processing circuit enables the anti-theft function, wherein said at least one predetermined condition is at least related to the first location; and when at least one release condition is satisfied, the processing circuit disables the anti-theft function, wherein said at least one release condition is related to a gesture applied to the touch-sensitive panel by at least one finger of the user;

wherein after the anti-theft function is enabled, when a change of the first location or a disappearance of the first detection point is detected, the processing circuit triggers an alarm or a warning message.

15. The electronic device of claim 14, wherein said at least one predetermined condition is related to the first location and the multiple other locations; and when the first location and the multiple other locations are detected as remaining unchanged within a time interval and the time interval reaches a predetermined time, the processing circuit enables the anti-theft function.

16. The electronic device of claim 14, wherein the touch-sensitive panel is further configured to perform sensing of a second electrode of the input device, to detect a second detection point of the second electrode, wherein when the input device is put on the touch-sensitive panel, the second detection point corresponds to a second location of the second electrode on the touch-sensitive panel; the processing circuit determines whether an angle of the input device relative to the touch-sensitive panel is equal to a predetermined angle at least according to the first location and the second location; and when the angle is detected to be equal to the predetermined angle, the first location remains unchanged within a time interval, and the time interval reaches a predetermined time, the processing circuit enables the anti-theft function.

17. The electronic device of claim 14, wherein after the anti-theft function is enabled, when the gesture is detected, the processing circuit determines whether to disable the anti-theft function according to whether the gesture conforms to a predetermined gesture; and if the gesture conforms to the predetermined gesture, the processing circuit disables the anti-theft function, otherwise, the processing circuit triggers an alarm or a warning message.

18. The electronic device of claim 14, wherein the processing circuit controls the electronic device to output the alarm or inform another electronic device associated with the electronic device to make the other electronic device output the alarm or show the warning message.

* * * * *